United States Patent
Perez et al.

(10) Patent No.: US 11,512,539 B2
(45) Date of Patent: Nov. 29, 2022

(54) METHODS OF CONDUCTING COILED TUBING OPERATIONS

(71) Applicant: FORUM US, INC., Houston, TX (US)

(72) Inventors: Jessica Lorae Olson Perez, Houston, TX (US); Fernando Luna, Houston, TX (US); Irma Irais Galvan, Humble, TX (US); Garry F. McClelland, Arvada, CO (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 16/720,342

(22) Filed: Dec. 19, 2019

(65) Prior Publication Data

US 2021/0189807 A1 Jun. 24, 2021

(51) Int. Cl.
| | |
|---|---|
| *E21B 17/10* | (2006.01) |
| *E21B 17/20* | (2006.01) |
| *E21B 19/22* | (2006.01) |
| *F16L 9/14* | (2006.01) |
| *E21B 19/08* | (2006.01) |
| *E21B 19/16* | (2006.01) |

(52) U.S. Cl.
CPC .......... *E21B 17/1007* (2013.01); *E21B 17/20* (2013.01); *E21B 19/22* (2013.01); *E21B 19/08* (2013.01); *E21B 19/16* (2013.01); *F16L 9/14* (2013.01)

(58) Field of Classification Search
CPC ...... E21B 17/1007; E21B 17/20; E21B 19/22; E21B 19/08; E21B 19/16; F16L 9/14
See application file for complete search history.

(56) References Cited

U.S. PATENT DOCUMENTS

| | | |
|---|---|---|
| 2,460,657 A | 2/1949 | Robinson |
| 2,982,312 A | 5/1961 | Caplan et al. |
| 3,278,330 A | 10/1966 | De Vau et al. |
| 4,863,091 A | 9/1989 | Dubois |
| 5,515,707 A | 5/1996 | Smith |
| 8,052,173 B2 | 11/2011 | Carcagno et al. |

(Continued)

FOREIGN PATENT DOCUMENTS

| | | |
|---|---|---|
| WO | 2013082134 A1 | 6/2013 |
| WO | 2017106956 A1 | 6/2017 |

OTHER PUBLICATIONS

Afghoul, Ali Chareuf et al., "Coiled Tubing: The Next Generation", Oilfield Review, 2004, pp. 38-57.

(Continued)

*Primary Examiner* — Taras P Bemko
*Assistant Examiner* — Yanick A Akaragwe
(74) *Attorney, Agent, or Firm* — Ewing & Jones, PLLC

(57) ABSTRACT

Aspects of the present disclosure relate to methods of coating a coiled tubing string, methods of conducting tubing operations using a coated tubing string, and associated apparatus thereof. In one implementation, a method of conducting a coiled tubing operation, includes forming a tubing string. The tubing string has a central annulus, an inner surface, and an outer surface, and the tubing string is formed from a metallic material. The method also includes coiling the tubing string onto a spool, and moving a coating into the central annulus. The method also includes curing the (Continued)

coating onto the inner surface of the tubing string to form a layer of the coating on the inner surface of the tubing string.

23 Claims, 3 Drawing Sheets

(56) References Cited

U.S. PATENT DOCUMENTS

| | | | |
|---|---|---|---|
| 8,258,206 B2 | 9/2012 | Kanagasabapathy et al. | |
| 8,602,113 B2 | 12/2013 | Jin et al. | |
| 9,528,327 B1 | 12/2016 | Lux | |
| 9,541,224 B2 | 1/2017 | Rowland et al. | |
| 10,364,931 B1 | 7/2019 | Arumugam et al. | |
| 2004/0237890 A1* | 12/2004 | Bour | F16L 58/10 118/715 |
| 2010/0044110 A1 | 2/2010 | Bangru et al. | |
| 2010/0206553 A1 | 8/2010 | Bailey et al. | |
| 2011/0024103 A1* | 2/2011 | Storm, Jr. | E21B 17/206 166/65.1 |
| 2011/0203791 A1* | 8/2011 | Jin | E21B 17/042 166/244.1 |
| 2011/0220415 A1 | 9/2011 | Jin et al. | |
| 2012/0000643 A1* | 1/2012 | Bruun | B01D 19/00 166/75.12 |
| 2014/0021244 A1 | 1/2014 | DuBois | |
| 2014/0287161 A1 | 9/2014 | Ertas et al. | |
| 2018/0200770 A1 | 7/2018 | Rowland | |
| 2019/0224716 A1* | 7/2019 | Fuierer | F16L 58/14 |

OTHER PUBLICATIONS

"A Breakthrough Pipeline Surface Treatment," OceanIt, pp. 1-2 (accessed Jun. 2019).

"Corrosion Prevention and Control Worldwide", Materials Performance, Jan. 2018, pp. 1-80, vol. 57 No. 1.

Ali, Naser et al., "A Review on Nanofluids: Fabrication, Stability, and Thermophysical Properties", Journal of Nanomaterials, Jun. 4, 2018, pp. 1-33, vol. 18.

International Search and Written Opinion dated Apr. 4, 2018, corresponding to Application No. PCT/US2018/013988.

Lauer, Robert S., "The Use of High Performance Polymeric Coatings to Mitigate Corrosion and Deposit Formation in Pipeline Applications", 2007, pp. 1-8.

Lauer, Robert S., "Advancements in the Abrasion Resistance of Internal Plastic Coatings", Materials Performance, NACE International, Jan. 2014, pp. 52-55.

Oceanit, "Flow Through Hydrophobic & Hydrophilic Pipes", YouTube, Sep. 18, 2017, https://www.youtube.com/watch?v=sPoTJ0GCkHU.

Oceanit, "Hydrophilic and Hydrophobic Treatment Demo | Oceanit Surface Treatments", YouTube, Dec. 12, 2017, https://www.youtube.com/watch?v=sbuTk8hpnkc.

Oceanit, "DragX | Pipeline Surface Treatment | Oceanit Surface Treatments", YouTube, Feb. 16, 2018, https://www.youtube.com/watch?v=qMZPDY1WI8Q.

Oceanit, "Hydrophobic Roll-Off Angle Test | Oceanit Surface Treatments", YouTube, Feb. 27, 2018, https://www.youtube.com/watch?v=PKsqFAXVqzc.

Oceanit, "Omniphobic Wetting Behavior | Oceanit Surface Treatments", YouTube, Mar. 1, 2018, https://www.youtube.com/watch?v=td50EevSgRs.

Non-Final Office Action dated Nov. 23, 2020 for U.S. Appl. No. 16/282,971.

Elliot, K. J. et al., "Laboratory Evaluation of a Novel Metal Surface Treatment for Coiled Tubing Friction Reduction in Extended-Reach Wells", Society of Petroleum Engineers, 2018, pp. 1-11.

International Search Report and Written Opinion dated May 7, 2020 for Application No. PCT/US2020/017946.

* cited by examiner

METHODS OF CONDUCTING COILED TUBING OPERATIONS

BACKGROUND

Field

The disclosure relates to methods of coating an inner surface of a coiled tubing string, methods of conducting tubing operations using a coated tubing string, and associated apparatus thereof.

Description of the Related Art

Operational problems can arise when pumping fluids through coiled tubing. For example, frictional forces between the pumped fluids and the coiled tubing can require excess pumping power to pump the fluids, excess pressure to pump the fluids, and/or a different fluid composition. Frictional forces can also hinder fluid flow rates. Such problems can result in large operational costs, delayed operations, and/or operational failures. Such problems can also reduce the useful life of the coiled tubing.

Therefore, there is a need for coiled tubing as a conduit for operations where frictional forces between pumped fluids and coiled tubing are reduced.

SUMMARY

Implementations of the present disclosure relate to methods of conducting a coiled tubing operation.

In one implementation, a method of conducting a coiled tubing operation, includes forming a tubing string. The tubing string has a central annulus, an inner surface, and an outer surface, and the tubing string is formed from a metallic material. The method also includes coiling the tubing string onto a spool, and moving a coating into the central annulus. The method also includes curing the coating onto the inner surface of the tubing string to form a layer of the coating on the inner surface of the tubing string.

In one implementation, a method of conducting a coiled tubing operation includes applying a coating onto a surface of a metal substrate, and curing the coating onto the surface of the metal substrate to form a layer of the coating in contact with the surface of the metal substrate. The method also includes forming a tubing string from the metal substrate such that the surface of the metal substrate forms an inner surface of the tubing string. The tubing string has a central annulus, the inner surface, and an outer surface. The method also includes coiling the tubing string onto a spool.

In one implementation, a method of conducting a coiled tubing operation, includes forming a tubing string. The tubing string has a central annulus, an inner surface, and an outer surface. The method also includes applying a coating onto the inner surface of the tubing string, and curing the coating onto the inner surface of the tubing string to form a layer of the coating in contact with the inner surface of the tubing string. The method also includes coiling the tubing string onto a spool.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
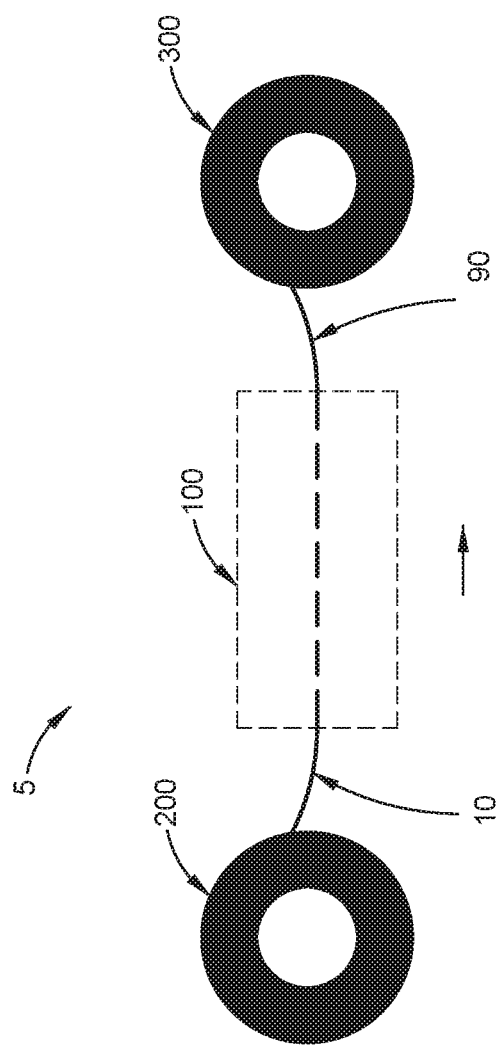
FIG. 1 is a schematic illustration of a coiled tubing string forming process, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to methods of coating an inner surface of a coiled tubing string, methods of conducting tubing operations using a coated tubing string, and associated apparatus thereof. The inner surface of the tubing string is coated to improve flow characteristics such that the surface energy of a coated surface is less than that of the steel from which the tubing string is formed to allow fluids to flow over the inner surface more easily. The coated inner surface of the tubing string reduces friction that fluids encounter when being pumped through the tubing string, which thereby reduces head loss of the fluid flowing through the tubing string. The coated inner surface of the tubing string could also have the benefit to reduce or minimize corrosion of the inner surface of the tubing string, facilitating increases in lifespans of the tubing string.

FIG. 1 is a schematic illustration of a coiled tubing string forming process 5, according to one implementation. The coiled tubing string forming process 5 includes uncoiling a flat sheet 10 of metal from an accumulator 200, feeding the flat sheet 10 through a method 100 of manufacturing a coiled tubing string, and coiling the formed tubing string 90 onto a spool 300, all in a single continuous operation to meet specified material properties. Although additional testing, inspection, and installation may occur after the tubing string 90 is spooled onto the spool 300, the tubing string 90 will be manufactured to meet specified material properties upon being coiled onto the spool 300.

The specified material properties may include, but are not limited to, physical properties, mechanical properties, and structural properties. The physical properties may include, but are not limited to, dimensions (such as length, inner/outer diameter size, and wall thickness), surface quality (such as smoothness), and roundness. The mechanical properties may include but are not limited to, yield strength, tensile strength, elongation, elastic modulus, toughness, fracture toughness, hardness, fatigue life, fatigue strength, ductility. The structural properties may include, but are not limited to grain size, microstructure, and composition.

The method 100 of manufacturing a coiled tubing string in a continuous operation, begins with a continuous flat sheet 10 of metal and ends with a tubing string 90 coiled onto a spool 300 (shown in FIG. 1). The flat sheet 10 of metal may be pre-coiled onto the accumulator 200. The flat sheet 10 of metal may include steel.

The flat sheet 10 of metal is continuously fed from the accumulator 200 into the method 100. The method 100 of manufacturing the coiled tubing string may include one or more manufacturing operations such as one or more of: tubing forming, seam welding, annealing, cooling, tube sizing, inspection and/or testing, austenitizing, quenching, tempering, stress-relieving, and/or coating an outer surface of the tubing string. One or more operations of the method 100 can be performed continuously in an in-line process as the flat sheet 10 of metal is fed from the accumulator and the formed tubing string 90 is coiled onto the spool 300.

The specified material properties of the tubing string 90 formed by the method 100 may be substantially uniform across substantially the entire length of the tubing string 90 but may vary within normal tolerance ranges appropriate for the resulting product as defined by the manufacturer. The tubing string 90 may be formed of any type of metallic material, such as steel.

Figure 2:
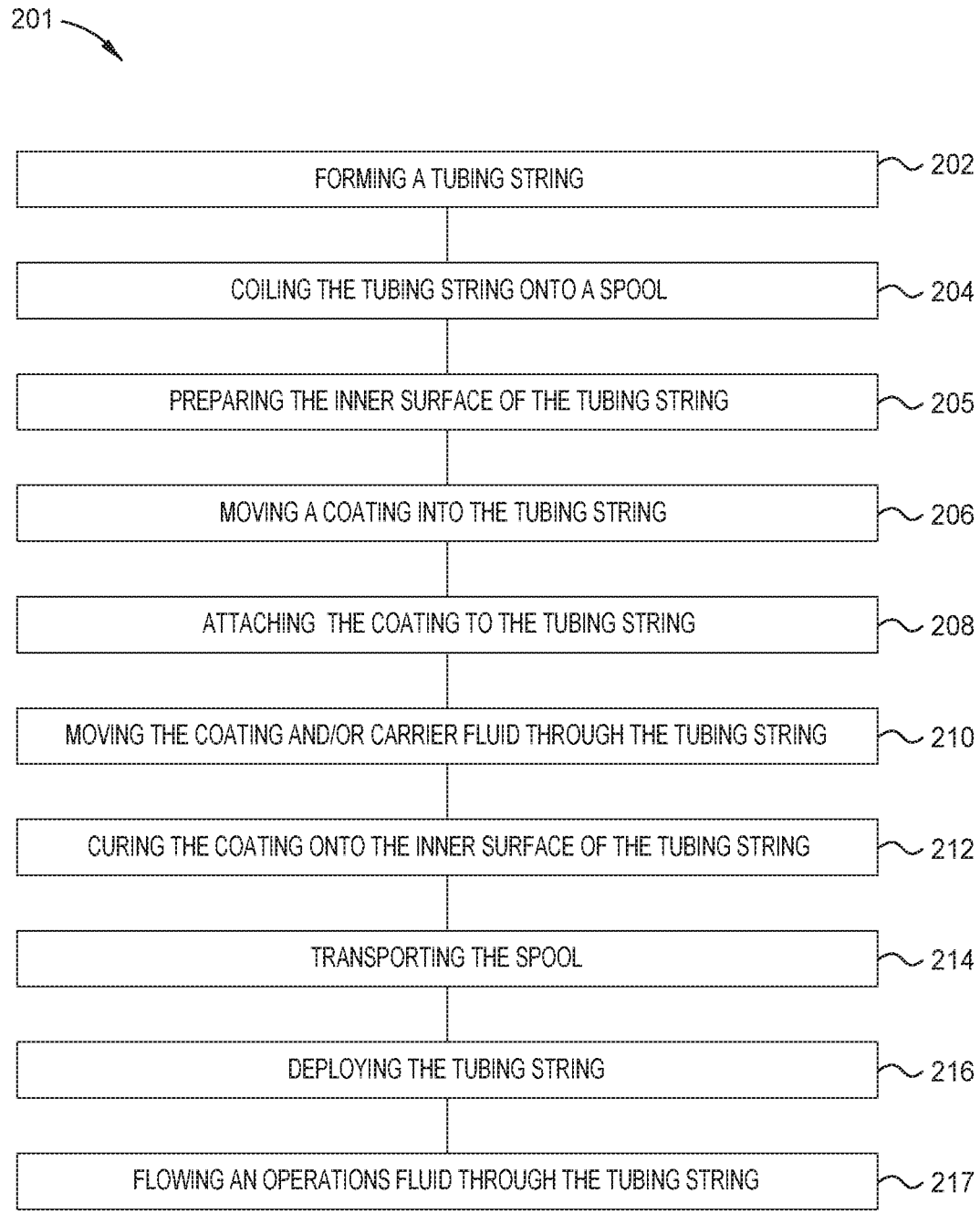
FIG. 2 illustrates a method of conducting a coiled tubing operation, according to one implementation.

FIG. 2 illustrates a method 201 of conducting a coiled tubing operation, according to one implementation. The present disclosure contemplates that one or more of the coiled tubing operations of the method 201 may include and/or be performed during manufacturing of the coiled tubing string in a manufacturing facility and/or during use of the coiled tubing string in one or more operations in the field. The tubing string that is formed may be a monolithic body having a homogeneous composition of steel through the length of the tubing string. The inner surface of the tubing string may be coated before, during, and/or after the tubing string is formed, as well as before, during, and/or after the tubing string is coiled onto a spool for transfer to a worksite. The tubing string is transferred to the worksite for use in the field, such as by being lowered into a wellbore for operations ultimately resulting in the production of hydrocarbons.

At block 202 a tubing string is formed. In one example, the tubing string 90 is formed according to one or more operations of the coiled tubing string forming process 5 described above, such as the one or more operations prior to the tubing string 90 being coiled onto the spool 300. In one example, the forming the tubing string of block 202 includes one or more operations of the method 100 of manufacturing a coiled tubing string described above. The tubing string formed at block 202 has a central annulus, an inner surface, and an outer surface. The tubing string comprises a metallic material, such as steel.

Block 204 includes coiling the tubing string onto a spool. In one example, block 204 includes coiling the tubing string 90 onto the spool 300. The tubing string may be formed and coiled onto the spool in a single continuous, in-line process.

After the tubing string is coiled onto a spool at block 204, the spool having the coiled tubing string may be moved. In one example, the spool is moved from the location and/or facility where block 202 and/or block 204 occurred. In one example, block 202 and/or block 204 occur as part of an in-line process, and the spool having the coiled tubing string is moved offline.

Block 205 includes preparing the inner surface of the tubing string. The inner surface of the tubing string is prepared for application of a coating, as discussed below. In one example, the inner surface of the tubing string is prepared after the spool and the coiled tubing string are moved. The preparing the inner surface at block 205 includes one or more of cleaning, roughening, and/or scoring the inner surface of the tubing string and/or removing debris and/or buildup from the inner surface. The preparing may remove debris or buildup from the inner surface and may smooth the inner surface.

In one embodiment, which can be combined with other embodiments, the preparing includes launching one or more objects and running the one or more objects through the coiled tubing string. In one example, the one or more objects include a pig and/or a wire brush. The pig may be a wiper pig, a wire brush pig, any other pig, or combinations thereof.

In one embodiment, which can be combined with other embodiments, the preparing includes cleaning by introducing one or more cleaning agents into the central annulus of the coiled tubing string. In one example, the one or more cleaning agents include one or more acids, such as one or more of phosphoric acid and/or citric acid. The preparing the inner surface of the tubing string of block 205 may be performed at various stages of the method 201. For example, the preparing the inner surface of the tubing string may be performed prior to, or subsequent to, the forming the tubing string at block 202.

The preparing the inner surface of the tubing string at block 205 is optional. In one example, a tubing string is used that has an inner surface which is already prepared. For example, a tubing string having a prepared surface is coiled onto the spool at block 204.

Block 206 includes moving a coating into the central annulus of the tubing string. The coating is a multi-functional coating. The coating may be in a liquid phase. The coating may be moved into the tubing string in an optional carrier fluid that carries the coating. In one example, the coating includes a nanocoating and may include one or more nanoparticles. The coating is introduced into the central annulus at a first end of the tubing string.

In one embodiment, which can be combined with other embodiments, the coating includes but is not limited to a composition including one or more metallic materials, one or more polymer materials, and/or one or more epoxy materials. In one example, the coating includes a composition including one or more of nylon and/or polyvinyl.

In one embodiment, which can be combined with other embodiments, the coating includes but is not limited to one or more silicon materials. In one embodiment, which can be combined with other embodiments, the coating includes a composition having silicon and oxygen, with any number of silicon atoms and any number of oxygen atoms. In one embodiment, which can be combined with other embodiments, the coating includes a composition having silicon and carbon, with any number of silicon atoms and any number of carbon atoms. In one embodiment, which can be combined with other embodiments, the coating includes ceramic particles. The coating may include, but not be limited to, one or more of silicon dioxide ($SiO_2$), aluminum oxide, titanium dioxide, and/or silicon carbide (SiC).

In one example where the coating is carried in a carrier fluid, less than 50 gallons of the carrier fluid carrying the coating is pumped through the tubing string at block 206. In one example, 20 gallons to 30 gallons of the carrier fluid carrying the coating is pumped through the tubing string at block 206. The carrier fluid is pumped through the tubing string at a volumetric flow rate proportional to a surface area of the inner surface of the tubing string. The carrier fluid is pumped into the tubing string in a liquid phase. The carrier fluid may include one or more of a solvent, water, toulene, glycol, butyl acetate, t-butyl acetate, and/or ethylene glycol. The carrier fluid and the coating are pumped into the tubing string at a carrier fluid-to-coating ratio of X:Y by weight. The X of the ratio is within a range of 5 to 8 and the Y of the ratio is within a range of 2 to 5. In one example, the ratio is 7:3.

Block 208 includes attaching the coating to the inner surface of the tubing string. The coating mechanically and/or chemically bonds to the inner surface of the tubing string. In an example where the coating includes a nanocoating, one or more nanoparticles of the nanocoating attach to the inner surface. In one example, less than all of the coating carried into the central annulus attaches to the inner surface of the tubing string. The coating may attach to the inner surface of the tubing string as the carrier fluid as pumped through the central annulus of the tubing string.

Block 210 includes moving the coating and/or the carrier fluid (if a carrier fluid is used) through the tubing string. Less than all, or none, of the coating may be moved through the tubing string at block 210. The coating and/or the carrier fluid are moved out of the tubing string at a second end of the tubing string, exhausting at least part of the coating and/or the carrier fluid from the central annulus of the tubing string. The carrier fluid that—if used—is moved through and out of the tubing string includes one or more particles of the coating. In one example, the carrier fluid—if used—that is moved through and out of the tubing string includes one or more particles of the coating that did not attach to the inner surface of the tubing string at block 208 such that the attached particles of the coating remain on the inner surface of the tubing string after block 210.

In one embodiment, which can be combined with other embodiments, the moving of the coating and/or the carrier fluid through the tubing string includes launching and running one or more pigs through the central annulus of the tubing string. One or more surfaces of the one or more pigs contact the inner surface of the coiled tubing string as the one or more pigs run through the central annulus of the coiled tubing string. The one or more pigs facilitate moving the coating and/or the carrier fluid through the central annulus of the tubing string. The one or more pigs that move the coating and/or the carrier fluid include one or more of a squeegee, a foam pig, a sponge, a poly pig and/or a cleaning pig. In one example, the one or more pigs that move the coating and/or the carrier fluid comprise polyurethane. In one example, a pressurized fluid is pumped behind the launched pig, which is behind the coating and/or the carrier fluid, to move the pig through the central annulus of the coiled tubing string. In one example, the pressurized fluid includes one or more of nitrogen, warm air, and/or carbon dioxide. The pressurized fluid may include any carrier fluid that can be pressurized, such as a liquid and/or a gas.

In one embodiment, which can be combined with other embodiments, the coating and/or the carrier fluid are moved through the tubing string using gravitational forces. In one example, the moving the coating and/or the carrier fluid includes rotating the spool onto which the tubing string is coiled. The spool is rotated until the coating and/or the carrier fluid moves from the first end of the tubing string to the second end of the tubing string. Gravitational forces may be used with or without one or more pigs to move the coating and/or the carrier fluid through the tubing string. Gravitational forces and/or pressure differentials may be used to remove the coating and/or the carrier fluid from the second end of the tubing string.

In one embodiment, which can be combined with other embodiments, the moving the carrier fluid through the tubing string includes pumping a purge fluid into the central annulus to contact the carrier fluid and facilitate moving the carrier fluid through the central annulus of the coiled tubing string. The purge fluid has a density that is greater than a density of the carrier fluid that may contain one or more particles of the coating. The purge fluid includes one or more slugs, such as one or more slugs formed in the central annulus of the tubing string. The one or more formed slugs facilitate moving the carrier fluid through the tubing string. The purge fluid includes water, such as treated water, for example distilled water or clean water.

Block 212 includes curing the coating onto the inner surface of the coiled tubing string. The coating may include the particles that attached to the inner surface at block 208. A layer of the coating is formed on the inner surface of the coiled tubing string. In one example, the coating is cured at an ambient temperature, such as a room temperature. In one example, the coating is cured at a temperature above an ambient temperature, such as above a room temperature. In one example, the coating is cured at a temperature above 120 degrees Fahrenheit, such as 350 degrees Fahrenheit to 800 degrees Fahrenheit. In one example, the curing of the coating occurs as a result of heating the tubing string above an ambient temperature.

In one embodiment, which can be combined with other embodiments, the curing of the coating includes pumping one or more curing fluids into the central annulus of the coiled tubing string. In one example, the one or more curing fluids may include one or more of nitrogen, carbon dioxide, warm air, and/or dry air, such as dehumidified air. The one or more curing fluids may include the pressurized fluid that is used to move the one or more pigs that move the carrier fluid, as discussed above in reference to block 210. In such an example, the pressurized fluid facilitates curing the coating.

In one embodiment, which can be combined with other embodiments, the curing of the coating includes pumping one or more curing fluids into the central annulus of the coiled tubing string. In one embodiment, which can be combined with other embodiments, the curing of the coating includes running the tubing string through an induction coil to locally increase the temperature of the tubing and evaporate the solvents contained in the coating to facilitate a faster cure. In one example, the tubing string is uncoiled from the spool after block 204 and prior to running the tubing string through the induction coil, and the tubing string is coiled onto a second spool after running the tubing string through the induction coil. In such an example, the second spool may be transported at block 214.

In one example the curing fluids are pumped into the central annulus at an ambient temperature, such as a room temperature. In one embodiment, which can be combined with other embodiments, the one or more curing fluids (which may include the pressurized fluid) are heated. In one example, the one or more curing fluids are heated to a temperature above an ambient temperature such as above a room temperature. In one example, the one or more curing fluids are heated to a temperature above 120 degrees Fahrenheit, such as 350 degrees Fahrenheit to 800 degrees Fahrenheit.

The temperatures discussed in reference to curing the coating facilitate promoting the speed of curing and/or the quality of the layer of coating that is formed.

Block 214 includes transporting the spool that includes the tubing string coiled thereon. The tubing string coiled on the spool includes the formed layer of coating. The spool is transported to a location, such as a wellsite to perform coiled tubing operations, such as drilling operations, hydraulic fracturing operations, intervention operations, production operations, and/or pumping operations.

Block 216 includes deploying the tubing string that is coiled on the spool to conduct coiled tubing operations. In one example, the tubing string is deployed downhole into an oil and gas wellbore. In one example, the tubing string is deployed during a riserless subsea operation, for example by paying out the tubing string from a spool on an offshore or subsea vessel and into a body of water below sea level to be used in relation to subsea equipment. In one example, the deployed tubing string may be used as a riser. Deploying the tubing string includes injecting the tubing string downhole and/or into a subsea environment, for example using an injector head, and uncoiling the tubing string from the spool.

Block 217 includes flowing an operations fluid through the central annulus of the tubing string. The operations fluid flows over the coating disposed on the inner surface of the tubing string. In one example, the operations fluid is a hydraulic fracturing fluid. In one example, the operations fluid is a drilling fluid, such as a drilling mud.

The aspects of method 201 are not limited to the sequence or number of blocks illustrated in FIG. 2, but may include other aspects that include re-ordering, repeating, adding, and/or removing one or more of the blocks 202, 204, 205, 206, 208, 210, 212, 214, 216, and/or 217. As an example, the aspects of a single block (such as block 205) may be repeated sequentially prior to the aspects of another block (such as block 206) occurring. As another example, a grouping of multiple blocks (such as blocks 206, 208 210, and 212) may be repeated prior to the aspects of another block (such as block 214) occurring. In one example, one or more of the blocks 202, 204, 205, 206, 208, 210, 212, 214, 216, and/or 217 are repeated to form a plurality of layers of the coating on the inner surface of the tubing string.

In one embodiment, which can be combined with other embodiments, the coating may be applied prior to the formation of the tubing string described for block 202. In such an embodiment, the coating is applied to a surface of a metal substrate. The metal substrate may be a flat sheet of carbon steel, for example. In one example, the metal substrate is the flat sheet 10 of metal described in relation to FIG. 1 above. The coating may be applied after the surface of the metal substrate is prepared. The surface of the metal substrate may be prepare by applying an acid to the surface of the metal substrate. The coating is then cured onto the surface of the metal substrate to form a layer of the coating in contact with the surface of the metal substrate. The coating may be cured by heating the metal substrate to a temperature above an ambient temperature. The layer of the coating formed on the surface of the metal substrate may have a thickness of less than 250 micrometers. After curing, the metal substrate is formed into a tubing string such that the surface of the metal substrate forms the inner surface of the tubing string. The tubing string is then coiled onto a spool (as described for block 204) and transported on the spool (as described for block 214).

In one embodiment, which can be combined with other embodiments, the coating may be applied after formation of the tubing string described for block 202 but before coiling the tubing string onto a spool described for block 204. In such an embodiment, the inner surface of the tubing string is prepared and then the coating is applied to the inner surface. The inner surface of the tubing string may be prepare by applying an acid to the inner surface of the tubing string. The coating is then cured onto the inner surface of the tubing string to form a layer of the coating in contact with the inner surface. The coating may be cured by running the tubing string through an induction coil. The coating may be cured by heating the tubing string to a temperature above an ambient temperature. The layer of the coating formed on the inner surface of the tubing string may have a thickness of less than 250 micrometers. After curing, the tubing string is then coiled onto a spool (as described for block 204) and transported on the spool (as described for block 214).

Figure 3:
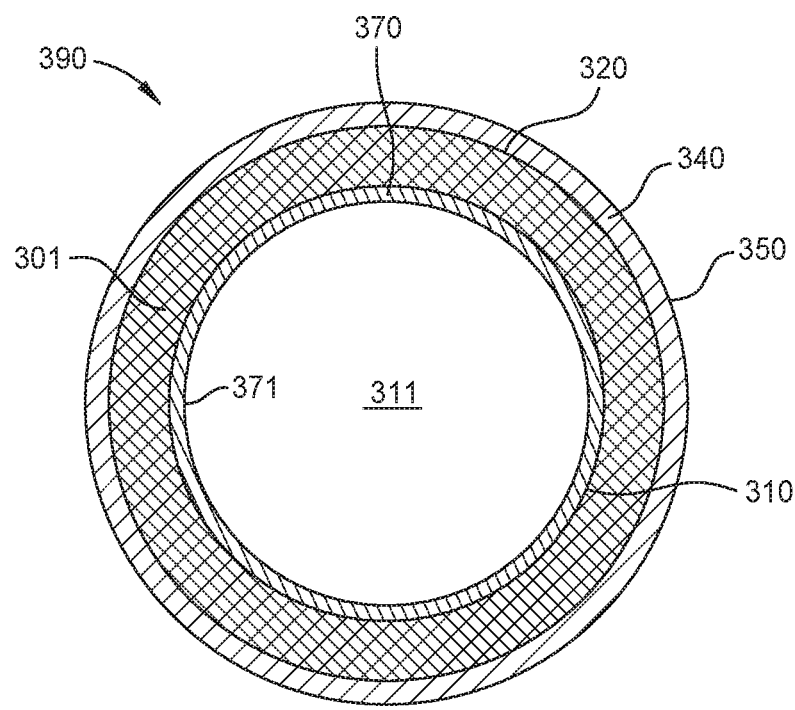
FIG. 3 illustrates a cross-sectional view of a coiled tubing string, according to one implementation, with the cut for the cross-sectional view being taken along section 3-3 illustrated in FIG. 4.
Figure 4:
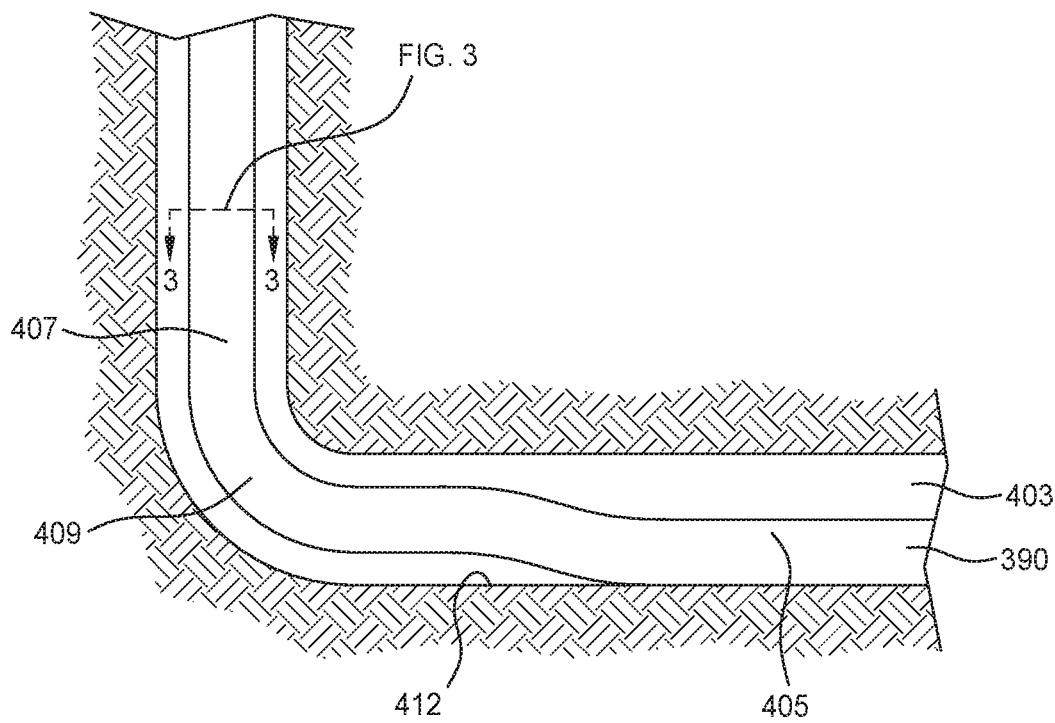
FIG. 4 illustrates a portion of a coiled tubing string deployed in a wellbore, according to one implementation.

FIG. 3 illustrates a cross-sectional view of a coiled tubing string 390, according to one implementation, with the cut for the cross-sectional view being taken along section 3-3 illustrated in FIG. 4. The coiled tubing string 390 includes a tubing string 301 that has an inner surface 310, an outer surface 320, and a central annulus 311. The tubing string 301 includes an optional external coating 340 disposed on the outer surface 320. The optional external coating 340 has an outer surface 350.

A layer of coating 370 is formed on the inner surface 310 of the tubing string 301. The layer of coating 370 defines an inner surface 371 of the coating 370 that interfaces with the central annulus 311. In one example, the coiled tubing string 390 was formed using one or more of the coiled tubing string forming process 5 (as shown in FIG. 1) and/or the method 201 of conducting a coiled tubing operation described above.

The tubing string 301 has a length within a range of about 500 feet to about 40,000 feet. In one example, the tubing string 301 has a length of 25,000 feet. The tubing string 301 has an outer diameter of less than 6.0 inches. In one example, the tubing string 301 has an outer diameter of 1.0 inches to 4.0 inches, such as less than 3.0 inches. In one example the tubing string 301 has an outer diameter of 2.0 inches to 2.5 inches.

An operations fluid can be pumped through the central annulus 311 and over the inner surface 371 of the layer of coating 370. The coating 370 has a surface energy that is lower than a surface energy of the steel inner surface 310 of the tubing string 301. The coating 370 may have a surface energy that is lower than a surface energy of the operations fluid. In one embodiment, which can be combined with other embodiments, the coating 370 includes but is not limited to a composition including one or more metallic materials, one or more polymer materials, and/or one or more epoxy materials. In one example, the coating includes a composition including one or more of nylon and/or polyvinyl.

The coating 370 may include one or more silicon materials. In one embodiment, which can be combined with other embodiments, the coating 370 includes a composition having silicon and oxygen, with any number of silicon atoms and any number of oxygen atoms. In one embodiment, which can be combined with other embodiments, the coating 370 includes a composition having silicon and carbon, with any number of silicon atoms and any number of carbon atoms. In one example, the one or more silicon materials of the coating include one or more of silicon dioxide ($SiO_2$), aluminum oxide, titanium dioxide, and/or silicon carbide (SiC).

The coating 370 facilitates reducing friction between the coiled tubing string 390 and a fluid (such as the operations fluid) flowing through the central annulus 311. The coating 370 can facilitate increasing the hydrophobic, oleophobic, and/or omniphobic characteristics of the coiled tubing string 390. Reduced friction between the coiled tubing string 390 and fluids flowing therethrough reduces the head pressure used to pump operational fluids to achieve flow rates or other operational parameters, thereby reducing pumping input. Reduced friction also allows a wider range of fluid compositions to be used as operations fluids that would otherwise not be feasible due to flow rate restrictions. The reduced friction reduces operational costs and operational delays, and increases the useful life of the coiled tubing string 390. As an example, the useful life may be increased for the coiled tubing string 390, reducing the number of coiled tubing spools used to conduct one or more coiled tubing operations.

The coating 370 also facilitates corrosion resistance of the coiled tubing string 390, facilitating increases of the useful life of the coiled tubing string 390.

The reduced pumping pressure facilitated by the reduced friction, in addition to increasing the useful life of the coiled tubing string 390, allows flexibility in specifying a size of the tubing string 301. As an example, the reduced friction allows for flexibility in specifying an inner diameter, an outer diameter, and/or a wall thickness of the tubing string 301. The reduced pumping pressure facilitates using smaller tubing strings, such as tubing strings having smaller inner diameters. Smaller tubing strings decrease the weight of the coiled tubing string 390 and facilitate lower operational costs.

The coating 370 can also adhere to the tubing string 301 for the useful life of the coiled tube string 390, providing friction-reducing capabilities for the coiled tubing string 390 over the entire life of the coiled tubing string 390.

The layer of coating 370 has a thickness of less than 250 micrometers, such as 5 micrometers to 15 micrometers. The small thickness of the layer of coating 370 minimizes the cross sectional area of the coiled tubing string 390 that is taken up by the layer of coating 370. The layer of coating 370 also has a hydrophobicity that reduces pressure loss of fluid flowing through the coiled tubing string 390 caused by frictional forces.

FIG. 4 illustrates a portion of the coiled tubing string 390 deployed in a wellbore 403 having a casing 412 during a coiled tubing operation, according to one implementation. The coiled tubing string 390 includes a horizontal portion 405 that is disposed horizontally in a horizontal section of the wellbore 403. The coiled tubing string 390 also includes a vertical portion 407 that is disposed vertically in a vertical section of the wellbore 403. The coiled tubing string 390 also includes a curved portion 409 that is disposed in a curved section of the wellbore 403. The wellbore 403 shown in FIG. 4 is only one schematic example of a wellbore trajectory, and one of ordinary skill in the art would recognize that the wellbore can include various other trajectories including vertical, curved, and/or horizontal sections having various increasing and/or decreasing inclination angles (e.g. sloping upward and/or downward), as well as various increasing and/or decreasing azimuthal angles (e.g. turning left or right).

In addition to the wellbore 403, the horizontal portion 405 and the vertical portion 407 of the coiled tubing string 390 may not be perfectly horizontal or vertical, respectively, when deployed into the wellbore 403. For example, the horizontal portion 405 may include portions that slope upwards or downwards at various points, and the vertical portion 407 may slope forward or backward at various points. As another example, the horizontal portion 405 and/or the vertical portion 407 of the coiled tubing string 390 may include one or more portions having one or more vertical waves and/or one or more horizontal waves.

The coating 370 illustrated in FIG. 3 can be formed along certain sections of the coiled tubing string 390, such as one or more of the vertical portion 407, the horizontal portion 405, and/or the curved portion 409. In one example, the coating 370 is disposed on the inner surface 310 along the entire length of the tubing string 301 that is to be deployed downhole in a wellbore. In one example, the coating 370 is disposed on the inner surface 310 along the entire length of the tubing string 301.

Benefits of the present disclosure include reduced friction between coiled tubing strings and operational fluids flowing therethrough; possible increased corrosion resistance for tubing strings; increased lifespan for tubing strings; reduced pressure loss across a tubing string; reduced pumping power input for a tubing string while maintaining pumping flow rates; reduced alteration of operations fluids; reduced operating pressures for tubing strings; tubing strings having small diameters; tubing strings having small wall thicknesses; reduced weight for tubing strings; and reduced operational costs for tubing strings.

Aspects of the present disclosure include a method of conducting a coiled tubing operation; a coating disposed on an inner surface of a tubing string coiled onto a spool; a coating having one or more metallic materials, one or more polymer materials, one or more epoxy materials, and/or one or more silicon materials; a coating having one or more of silicon dioxide and/or silicon carbide; and a layer of coating having a thickness of less than 250 micrometers. It is contemplated that one or more of these aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A method of conducting a coiled tubing operation, comprising:
    forming a tubing string, the tubing string having a central annulus, an inner surface, and an outer surface, and the tubing string being formed from a metallic material;
    coiling the tubing string onto a spool;
    moving a friction-reducing coating into the central annulus through use of a carrier fluid of at least one of toluene, glycol, butyl acetate, t-butyl acetate and ethylene glycol pumped into the tubing string in a liquid phase, wherein a carrier fluid to coating ratio is within a ratio of X:Y by weight wherein the value X is within a range of 5 to 8 and the value Y is within a second range of 2 to 5; and
    curing the friction-reducing coating onto the inner surface of the tubing string to form a layer of the friction-reducing coating on the inner surface of the tubing string, the friction-reducing coating being composed of a single layer of silicon dioxide, aluminum oxide, and titanium dioxide wherein a surface energy of the layer of the friction-reducing coating is lesser than a surface energy of the inner surface of the tubing string.

2. The method of claim 1, further comprising preparing the inner surface of the tubing string prior to moving the friction-reducing coating into the central annulus.

3. The method of claim 2, wherein the preparing the inner surface of the tubing string comprises launching one or more of a pig or a wire brush.

4. The method of claim 2, wherein the preparing the inner surface of the tubing string comprises applying an acid to the inner surface of the tubing string.

5. The method of claim 1, wherein the moving the friction-reducing coating into the central annulus comprises moving the carrier fluid into the central annulus that carries the friction-reducing coating.

6. The method of claim 1, further comprising moving the friction-reducing coating through the tubing string prior to the curing of the friction-reducing coating, and the moving the friction-reducing coating through the tubing string comprises:
pumping a purge fluid into the central annulus to move the friction-reducing coating; and
exhausting part of the friction-reducing coating from the central annulus using the purge fluid.

7. The method of claim 6, wherein the pumping the purge fluid into the central annulus to move the friction-reducing coating comprises forming one or more slugs of water in the central annulus.

8. The method of claim 1, further comprising moving the friction-reducing coating through the tubing string prior to the curing of the friction-reducing coating, and the moving the friction-reducing coating through the tubing string comprises:
pumping a pressurized fluid to move a pig through the tubing string; and
exhausting part of the friction-reducing coating from the central annulus of the tubing string using the pig.

9. The method of claim 8, further comprising heating the pressurized fluid.

10. The method of claim 1, wherein the moving the friction-reducing coating into the central annulus comprises moving the carrier fluid that carries the friction-reducing coating.

11. The method of claim 1, wherein the curing of the friction-reducing coating onto the inner surface of the tubing string occurs at a temperature above an ambient temperature.

12. The method of claim 1, wherein the curing of the friction-reducing coating onto the inner surface of the tubing string occurs as a result of heating the tubing string to a temperature above an ambient temperature.

13. The method of claim 1, wherein the friction-reducing coating comprises one or more of a silicon-containing material or a ceramic material.

14. A method of conducting a coiled tubing operation, comprising:
applying a friction-reducing coating onto a surface of a metal substrate through use of a carrier fluid pumped onto the metal substrate in a liquid phase, wherein a carrier fluid to coating ratio is within a ratio of X:Y by weight wherein the value X is within a range of 5 to 8 and the value Y is within a second range of 2 to 5 and wherein the carrier fluid is of at least one of toluene, glycol, butyl acetate, t-butyl acetate and ethylene glycol;
curing the friction-reducing coating onto the surface of the metal substrate to form a layer of the friction-reducing coating in contact with the surface of the metal substrate, wherein a surface energy of the layer of the friction-reducing coating is lesser than a surface energy of the surface of the metal substrate wherein the friction-reducing coating is composed of a single layer of silicon dioxide, aluminum oxide, and titanium dioxide;
forming a tubing string from the metal substrate such that the surface of the metal substrate forms an inner surface of the tubing string, the tubing string having a central annulus, the inner surface, and an outer surface; and
coiling the tubing string onto a spool.

15. The method of claim 14, further comprising preparing the surface of the metal substrate by applying an acid to the surface prior to applying the friction-reducing coating onto the surface.

16. The method of claim 14, wherein the layer of the friction-reducing coating formed on the surface of the metal substrate has a thickness of less than 250 micrometers.

17. The method of claim 14, wherein after the tubing string is coiled onto the spool, the method further comprises deploying the tubing string into an oil and gas wellbore or during a riserless subsea operation, and flowing an operations fluid through the tubing string.

18. The method of claim 14, wherein the friction-reducing coating comprises one or more of a silicon-containing material or a ceramic material.

19. A method of conducting a coiled tubing operation, comprising:
forming a tubing string, the tubing string having a central annulus, an inner surface, and an outer surface;
applying a friction-reducing coating onto the inner surface of the tubing string the friction-reducing coating being composed of a single layer of silicon dioxide, aluminum oxide, and titanium dioxide through use of a carrier fluid pumped into the tubing string in a liquid phase, wherein a carrier fluid to coating ratio is within a ratio of X:Y by weight wherein the value X is within a range of 5 to 8 and the value Y is within a second range of 2 to 5 and wherein the carrier fluid is of at least one of toluene, glycol, butyl acetate, t-butyl acetate and ethylene glycol;
curing the friction-reducing coating onto the inner surface of the tubing string to form a layer of the friction-reducing coating in contact with the inner surface of the tubing string, wherein a surface energy of the layer of the friction-reducing coating is lesser than a surface energy of the inner surface of the tubing string; and
coiling the tubing string onto a spool.

20. The method of claim 19, further comprising preparing the inner surface of the tubing string by applying an acid to the inner surface prior to applying the friction-reducing coating onto the inner surface.

21. The method of claim 19, wherein the layer of the friction-reducing coating formed on the inner surface of the tubing string has a thickness of less than 250 micrometers.

22. The method of claim 19, wherein after the tubing string is coiled onto the spool, the method further comprises deploying the tubing string into an oil and gas wellbore or during a riserless subsea operation, and flowing an operations fluid through the tubing string.

23. The method of claim 19, wherein the friction-reducing coating comprises one or more of a silicon-containing material or a ceramic material.

* * * * *